(12) United States Patent
Muramatsu

(10) Patent No.: US 8,071,244 B2
(45) Date of Patent: Dec. 6, 2011

(54) FUEL CELL SYSTEM

(75) Inventor: Yasuyuki Muramatsu, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 888 days.

(21) Appl. No.: 12/107,792

(22) Filed: Apr. 23, 2008

(65) Prior Publication Data

US 2008/0268311 A1 Oct. 30, 2008

(30) Foreign Application Priority Data

Apr. 24, 2007 (JP) ................................ 2007-114002

(51) Int. Cl.
  *H01M 8/04* (2006.01)
(52) U.S. Cl. .......................... 429/429; 429/442; 429/447
(58) Field of Classification Search .................. 429/428, 429/429, 433, 442, 447, 443
  See application file for complete search history.

(56) References Cited

U.S. PATENT DOCUMENTS

| 6,893,758 | B2 | 5/2005 | Miyazawa et al. |
| 2006/0147772 | A1 | 7/2006 | Takemoto |
| 2006/0222915 | A1 | 10/2006 | Sumino et al. |
| 2007/0212581 | A1 | 9/2007 | Kanai et al. |
| 2007/0259227 | A1* | 11/2007 | Oishi et al. ...................... 429/19 |

FOREIGN PATENT DOCUMENTS

| JP | 61-269865 A | 11/1986 |
| JP | 2006-32210 A | 2/2006 |
| WO | WO2005/099015 A3 * | 10/2005 |

OTHER PUBLICATIONS

Oishi et al.; "Fuel Cell System and Control Method Therefor"; U.S. Appl. No. 10/599,632, filed Jun. 15, 2007.

* cited by examiner

*Primary Examiner* — Stephen J. Kalafut
(74) *Attorney, Agent, or Firm* — Keating & Bennett, LLP

(57) ABSTRACT

A fuel cell system includes a cell stack, a temperature sensor which detects a temperature of the cell stack, an outside air temperature sensor which detects an outside air temperature, and a CPU which controls a process in the fuel cell system. When the temperature of the cell stack is lower than a predetermined temperature, the fuel cell system performs a temperature raising operation of the cell stack by making the concentration of aqueous methanol solution in an aqueous solution tank higher than in a normal operation and by making an output of an aqueous solution pump greater than in the normal operation. The CPU sets a run time for the temperature raising operation based on a detection result from the outside air temperature sensor, a detection result from the temperature sensor, and a run time setting table which is stored in a memory. The fuel cell system is capable of raising a temperature of the fuel cell quickly and stably to the predetermined temperature.

9 Claims, 10 Drawing Sheets

FUEL CELL SYSTEM

BACKGROUND OF THE INVENTION

1. Field of the Invention

The present invention relates to a fuel cell system, and more specifically, to a fuel cell system which performs a temperature raising operation which increases the temperature of the fuel cell.

2. Description of the Related Art

Generally, in fuel cell systems, it is a known fact that as the fuel cell attains a predetermined temperature, the system shifts to a normal operation where constant power generation is possible. There has been a constant demand that the system should be able to shift to normal operation quickly, and there have been a number of proposals for a fuel cell system which performs a temperature raising operation which is aimed at a quick increase in the temperature of the fuel cell. For example, there are a fuel cell system which uses a heater to perform a temperature raising operation, and a fuel cell system which performs a temperature raising operation by decreasing the amount of the aqueous fuel solution circulating in the system. As another example, JP-A 61-269865 discloses a fuel cell system which performs a temperature raising operation by increasing the concentration of the aqueous fuel solution to a value higher than a value for normal operation. Also, JP-A 2006-286239 discloses a fuel cell system which makes an adjustment on the concentration of aqueous fuel solution and on the voltage of the fuel cell based on a difference between the temperature of the fuel cell and a target temperature, thereby achieving a stable power supply to electric appliances while performing a temperature raising operation.

In all of these techniques, the temperature raising operation is stopped once the temperature of the fuel cell has become not lower than a predetermined temperature. The fuel cell's cooling capability is influenced by the outside air temperature (ambient temperature), so if the outside air temperature is high, the temperature of the fuel cell continues to increase after the temperature raising operation has been stopped, and the temperature of the fuel cell becomes too high as compared to a predetermined target temperature. This poses a problem of accelerated deterioration of the fuel cell. In particular, fuel cell systems which use liquid fuel are apt to accelerated deterioration of the fuel cell since their thermal capacity is higher than those fuel cell systems which use gaseous fuel. In other words, once the temperature of the fuel cell systems becomes excessive, it will not decrease quickly.

SUMMARY OF THE INVENTION

In order to overcome the problems described above, preferred embodiments of the present invention provide a fuel cell system capable of increasing the temperature of the fuel cell quickly and stably to a predetermined temperature.

According to a preferred embodiment of the present invention, there is provided a fuel cell system which includes a fuel cell, a first temperature detection device arranged to detect temperature information regarding an outside air temperature, a temperature raising device arranged to perform a temperature raising operation which increases a temperature of the fuel cell, and a control device arranged to set a stopping condition for the temperature raising operation performed by the temperature raising device based on a detection result from the first temperature detection device.

In a preferred embodiment of the present invention, a stopping condition is set for the temperature raising operation based on temperature information regarding an outside air temperature, whereby the temperature raising operation is stopped at an early timing if the outside air temperature is high whereas the temperature raising operation is stopped at a late timing if the outside air temperature is low. When the outside air temperature is high, stopping the temperature raising operation at an early timing makes it possible to prevent the fuel cell from excessively exceeding a predetermined temperature at which shifting to normal operation is possible. In other words, it is possible to increase the temperature of the fuel cell to a predetermined temperature quickly and stably even if the outside air temperature is high, and to reduce deterioration of the fuel cell. On the other hand, it is possible to delay the stop timing of the temperature raising operation if the outside air temperature is low, and therefore it is possible to increase the temperature of the fuel cell to a predetermined temperature quickly and reliably by the temperature raising operation. As described, it is possible to increase the temperature of the fuel cell to a predetermined temperature quickly and stably regardless of the outside air temperature.

Preferably, the fuel cell system further includes a second temperature detection device arranged to detect temperature information regarding a temperature of the fuel cell, and the control device determines whether or not the temperature raising operation is necessary based on a detection result from the second temperature detection device. In this case, the temperature raising operation is not performed if the temperature of the fuel cell is close to a predetermined temperature; for example, when only a short time has elapsed since the previous normal operation. By not performing the temperature raising operation when the temperature of the fuel cell is close to a predetermined temperature as described, it becomes possible to reduce deterioration of the fuel cell more reliably.

Further preferably, the fuel cell generates power by using aqueous fuel solution, the temperature raising device includes an adjusting device arranged to adjust a concentration of the aqueous fuel solution, and the control device controls the adjusting device to obtain a higher concentration of the aqueous fuel solution than in normal operation, thereby causing the adjusting device to conduct the temperature raising operation. There is known as a matter of general knowledge a fuel cell which generates electric power when aqueous fuel solution containing fuel is supplied to an anode (fuel electrode) and air containing oxygen (oxidizer) is supplied to a cathode (air electrode). The temperature of such a fuel cell is increased not only by Joule heat from the power generation but also by fuel crossover, i.e., movement of the fuel from the anode to the cathode through the electrolyte film provided by a solid polymer film, for example, resulting in a reaction between the fuel and the oxygen contained in the air. The amount of fuel crossover from the anode to the cathode increases and the reaction between the fuel and oxygen in the cathode becomes more active by supplying the fuel cell with aqueous fuel solution which has a higher concentration than in normal operation. This makes it possible to increase the temperature of the fuel cell easily and quickly without relying upon an extra heating device such as a heater.

Further, preferably, the fuel cell generates power by using aqueous fuel solution, the temperature raising device includes an aqueous solution supplying device arranged to supply the aqueous fuel solution to the fuel cell, and the control device controls the aqueous solution supplying device to obtain a higher output of the aqueous solution supplying device than in normal operation, thereby causing the aqueous solution supplying device to conduct the temperature raising operation. By increasing the output of the aqueous solution supplying device as described, an internal pressure of the anode increases, making more fuel move across from the anode to the cathode, and to increase the temperature of the fuel cell more quickly.

Preferably, the control device sets a temperature of the fuel cell for stopping the temperature raising operation based on a detection result from the first temperature detection device. By setting the temperature of the fuel cell at which the temperature raising operation is stopped based on temperature information regarding the outside air temperature as described, a stop timing for the temperature raising operation which is appropriate for a given outside air temperature can be set easily.

Further preferably, the control device sets a run time for the temperature raising operation based on a detection result from the first temperature detection device. By setting the run time for the temperature raising operation based on temperature information regarding a detected outside air temperature as described, a stop timing for the temperature raising operation which is appropriate for a given outside air temperature can be set easily.

Further, preferably, the fuel cell system further includes a second temperature detection device arranged to detect temperature information regarding a temperature of the fuel cell, and storage device arranged to store information which indicates a correspondence between temperature information regarding the outside air temperature, temperature information regarding the temperature of the fuel cell, and the run time for the temperature raising operation. With the above arrangement, the control device sets a run time for the temperature raising operation based on a detection result from the first temperature detection device, a detection result from the second temperature detection device, and the information stored in the storage device. As described, there is prepared a set of information in advance, i.e., information which indicates a correspondence between temperature information regarding the outside air temperature, temperature information regarding the temperature of the fuel cell, and the run time for the temperature raising operation, and from this information, a retrieval is made to obtain a run time which corresponds to temperature information regarding a detected outside air temperature and corresponds to temperature information regarding the temperature of the fuel cell. With this arrangement, an appropriate run time can be set easily.

Fuel cell systems which use liquid fuel are prone to accelerated deterioration of the fuel cell because once the temperature of the fuel cell systems becomes excessive, it will not decrease quickly. The preferred embodiments of the present invention make it possible to bring the temperature of the fuel cell to a predetermined temperature quickly and stably, and therefore, is particularly applicable to fuel cell systems which use liquid fuel.

Generally, in fuel cell systems which are mounted on transportation equipment, it is often difficult to charge a secondary battery by using an external power source. Especially, it is necessary to shift to normal operation quickly, and the temperature of the fuel cell is likely to increase excessively beyond a necessary level. Since preferred embodiments of the present invention make it possible to increase the temperature of the fuel cell to a predetermined temperature quickly and stably, preferred embodiments of the present invention are particularly applicable to various types of transportation equipment.

Other features, elements, characteristics, and advantages of the present invention will become more apparent from the following description of preferred embodiments of the present invention with reference to the attached drawings.

DETAILED DESCRIPTION OF THE PREFERRED EMBODIMENTS

Hereinafter, preferred embodiments of the present invention will be described with reference to the drawings.

The preferred embodiments are cases in which a fuel cell system 100 is provided in a motorbike 10 as an example of transportation equipment.

The description will first cover the motorbike 10. It is noted that the terms left and right, front and rear, up and down as used in the preferred embodiments of the present invention are determined from the normal state of riding, i.e., as viewed by the driver sitting on the driver's seat of the motorbike 10, with the driver facing toward a handle 24.

Figure 1:
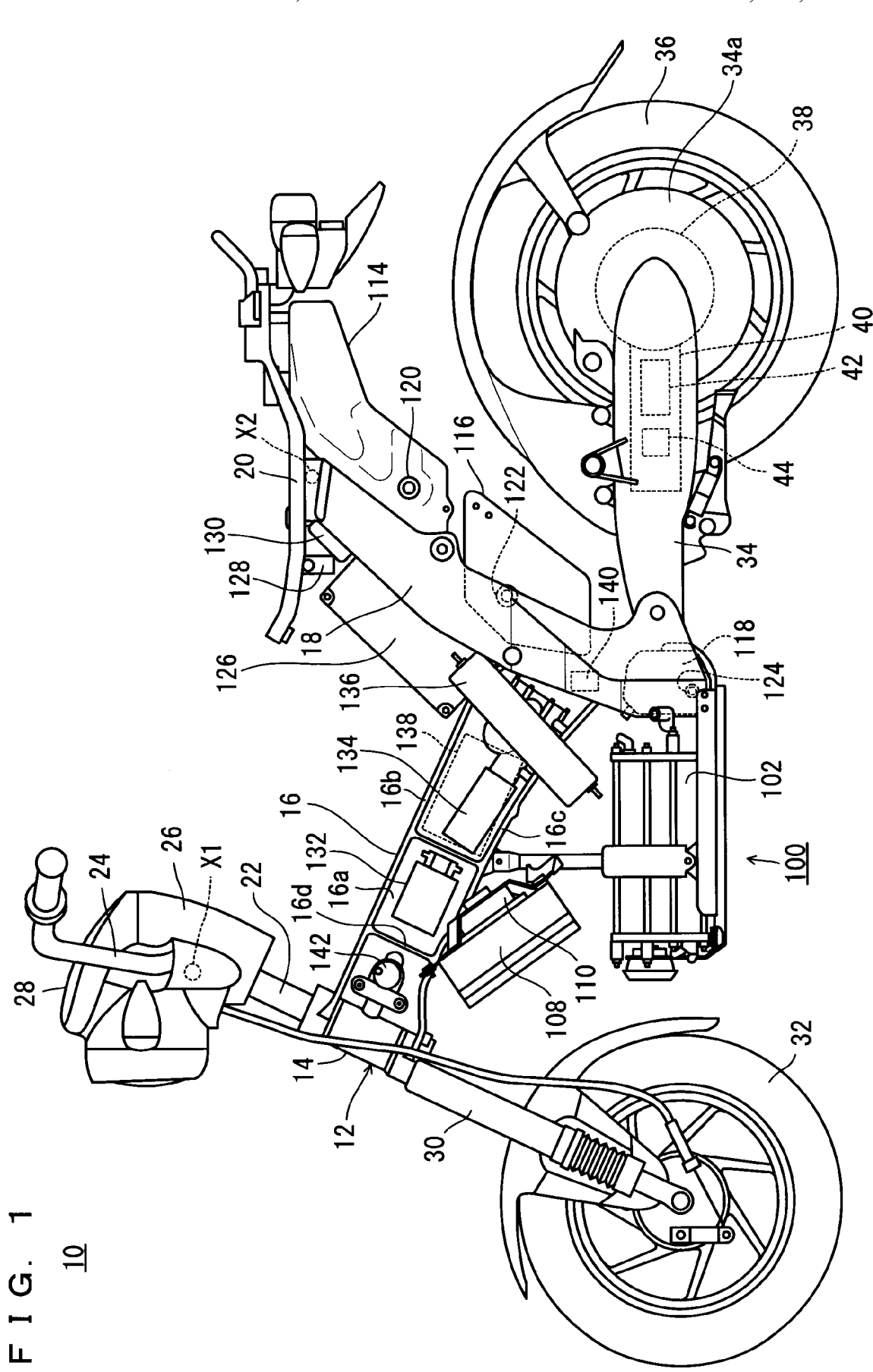
FIG. 1 is a left side view showing a motorbike as a preferred embodiment of the present invention.

Referring to FIG. 1, the motorbike 10 includes a vehicle frame 12. The vehicle frame 12 has a head pipe 14, a front frame 16 which has an I-shaped vertical section and extends in a rearward and downward direction from the head pipe 14, and a rear frame 18 which is connected with a rear end of the front frame 16 and rising in a rearward and upward direction.

The front frame 16 preferably includes a plate member 16a which has a width in the vertical direction and extends in a rearward and downward direction substantially perpendicularly to the lateral directions of the vehicle; flanges 16b, 16c which are located respectively at an upper edge and a lower edge of the plate member 16a, and extending in a rearward and downward direction and having a width in the lateral directions; and reinforcing ribs 16d protruding from both surfaces of the plate member 16a. The reinforcing ribs 16d and the flanges 16b, 16c define storage walls, providing compartments on both surfaces of the plate member 16a defining storage spaces for components of the fuel cell system 100 to be described later.

The rear frame 18 preferably includes a pair of left and right plate members each having a width in the front and rear directions, extending in a rearward and upward direction, and sandwiching a rear end of the front frame 16. The pair of plate members of the rear frame 18 have their upper end portions provided with seat rails 20 fixed thereto for installation of an unillustrated seat. Note that FIG. 1 shows the left plate member of the rear frame 18.

A steering shaft 22 is pivotably inserted in the head pipe 14. A handle support 26 is provided at an upper end of the steering shaft 22, to which the handle 24 is fixed. The handle support 26 has an upper end provided with a display/operation board 28.

Figure 3:
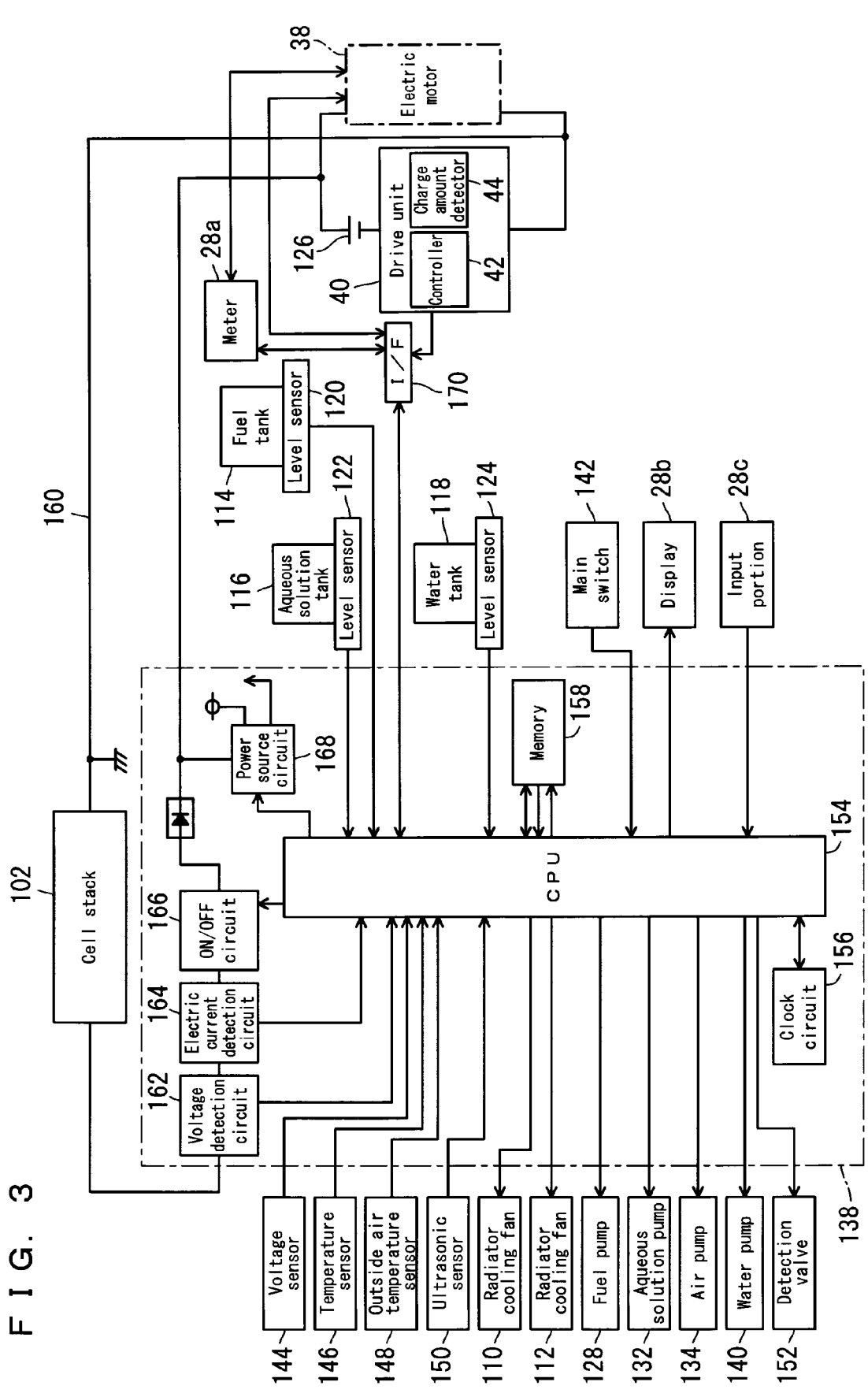
FIG. 3 is a block diagram showing an electric configuration of the fuel cell system according to a preferred embodiment of the present invention.

Referring also to FIG. 3, the display/operation board 28 preferably is an integrated dashboard including a meter 28a for measuring and displaying various data concerning an electric motor 38 (to be described later); a display 28b provided by, e.g., a liquid crystal display for providing the driver with a variety of information; and an input portion 28c for inputting a variety of commands and data.

As shown in FIG. 1, a pair of left and right front forks 30 extend from a bottom end of the steering shaft 22. Each of the front forks 30 includes a bottom end rotatably supporting a front wheel 32.

The rear frame 18 includes a lower end which pivotably supports a swing arm (rear arm) 34. The swing arm 34 has a rear end 34a incorporating the electric motor 38 of an axial gap type, for example, which is connected with the rear wheel 36 to rotate the rear wheel 36. The swing arm 34 also incorporates a drive unit 40 which is electrically connected with the electric motor 38. The drive unit 40 includes a motor controller 42 for controlling the rotating drive of the electric motor 38, and a charge amount detector 44 for detecting an amount of the charge in the secondary battery 126 (to be described later).

The motorbike 10 as described is equipped with a fuel cell system 100, with its constituent members being disposed along the vehicle frame 12. The fuel cell system 100 generates electric energy for driving the electric motor 38 and other system components.

Hereinafter, the fuel cell system 100 will be described, with reference to FIG. 1 and FIG. 2.

The fuel cell system 100 is preferably a direct methanol fuel cell system which uses methanol (an aqueous solution of methanol) directly without reformation, for generation of electric energy (power generation).

The fuel cell system 100 includes a fuel cell stack (hereinafter simply called cell stack) 102. As shown in FIG. 1, the cell stack 102 is suspended from the flange 16c, and is disposed below the front frame 16.

Figure 2:
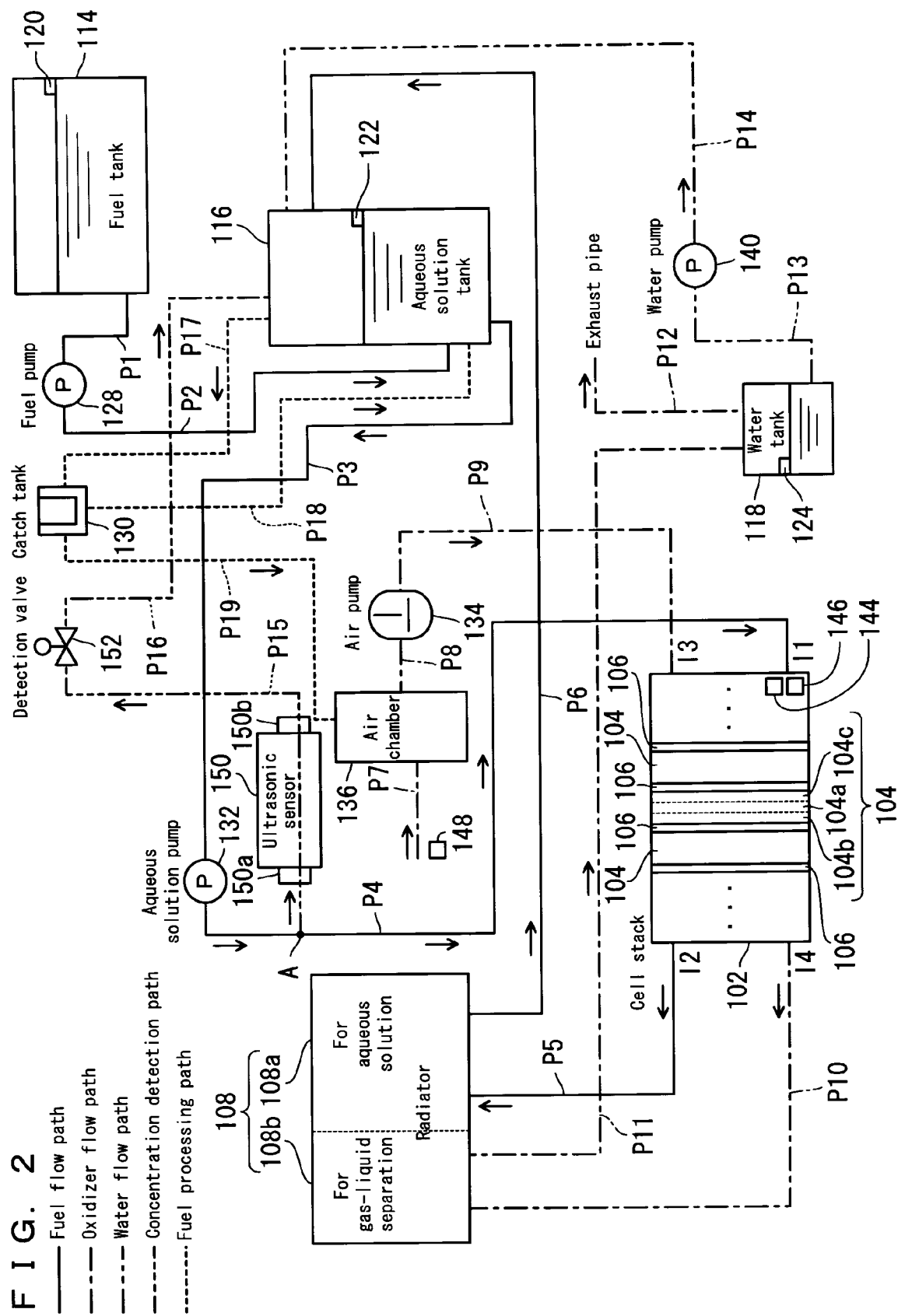
FIG. 2 is a system diagram showing piping in a fuel cell system according to a preferred embodiment of the present invention.

As shown in FIG. 2, the cell stack 102 includes a plurality of fuel cells (individual fuel cells) 104 layered (stacked) alternately with separators 106. Each fuel cell 104 is capable of generating electric power through electrochemical reactions between hydrogen ions based on methanol and oxygen (oxidizer). Each fuel cell 104 in the cell stack 102 includes an electrolyte film 104a, such as a solid polymer film, for example, and a pair of an anode (fuel electrode) 104b and a cathode (air electrode) 104c opposed to each other with the electrolyte film 104a in between. The electrolyte film 104a may be NAFION (Registered Trademark: DuPont) which is an example of a perfluorosulfonic acid polymer electrolyte film. The electrolyte film 104a has a heat resistant temperature of approximately 80° C. The anode 104b and the cathode 104c each include a platinum catalyst layer provided on the side closer to the electrolyte film 104a.

As shown in FIG. 1, a radiator unit 108 is disposed below the front frame 16, above the cell stack 102.

As shown in FIG. 2, the radiator unit 108 includes integrally therein, a radiator 108a for aqueous solution and a radiator 108b for gas-liquid separation. On a back side of the radiator unit 108, there is a fan 110 provided to cool the radiator 108a, and there is another fan 112 (see FIG. 3) provided to cool the radiator 108b. In FIG. 1, the radiators 108a and 108b are disposed side by side, with one on the left-hand side and the other on the right-hand side, but only shows the fan 110 for cooling the left-hand side radiator 108a.

A fuel tank 114, an aqueous solution tank 116, and a water tank 118 are disposed in this order from top to bottom, between the pair of plate members in the rear frame 18.

The fuel tank 114 contains a methanol fuel (high concentration aqueous solution of methanol) having a high concentration level (containing methanol at approximately 50 wt %, for example) which is used as the fuel for the electrochemical reaction in the cell stack 102. The aqueous solution tank 116 contains aqueous methanol solution, which is a solution of the methanol fuel from the fuel tank 114 diluted to a suitable concentration (containing methanol at approximately 3 wt %, for example) for the electrochemical reaction in the cell stack 102. The water tank 118 contains water which is produced in association with the electrochemical reaction in the cell stack 102.

The fuel tank 114 is provided with a level sensor 120, the aqueous solution tank 116 is provided with a level sensor 122, and the water tank 118 is provided with a level sensor 124. The level sensors 120, 122, and 124 preferably are float sensors, respectively, for example, in order to detect the height of the liquid (liquid level) in the respective tanks.

In front of the fuel tank 114 and above the front frame 16 is the secondary battery 126. The secondary battery 126 stores the electric power from the cell stack 102, and supplies the electric power to the electric components in response to commands from a controller 138 (to be described later). Above the secondary battery 126, a fuel pump 128 is disposed. Further, a catch tank 130 is disposed in front of the fuel tank 114, i.e., above and behind the secondary battery 126.

An aqueous solution pump 132 and an air pump 134 are housed in the storage space on the left side of the front frame 16. On the left side of the air pump 134 is an air chamber 136. The controller 138 and a water pump 140 are disposed in the storage space on the right side of the front frame 16.

Further, a main switch 142 is provided in the front frame 16, penetrating the storage space in the front frame 16 from right to left. Turning on the main switch 142 provides an operation start command to the controller 138 and turning off the main switch 142 provides an operation stop command to the controller 138.

As shown in FIG. 2, the fuel tank 114 and the fuel pump 128 are connected with each other by a pipe P1. The fuel pump 128 and the aqueous solution tank 116 are connected with each other by a pipe P2. The aqueous solution tank 116 and the aqueous solution pump 132 are connected with each other by a pipe P3. The aqueous solution pump 132 and the cell stack 102 are connected with each other by a pipe P4. The pipe P4 is connected with an anode inlet I1 of the cell stack 102. By driving the aqueous solution pump 132, aqueous methanol solution is supplied to the cell stack 102.

A voltage sensor 144 is provided near the anode inlet I1 of the cell stack 102 in order to detect concentration information, which reflects the concentration of the aqueous methanol solution (the ratio of methanol in the aqueous methanol solution) supplied to the cell stack 102, using an electrochemical characteristic of the aqueous methanol solution. The voltage sensor 144 detects an open-circuit voltage of the fuel cell 104, and the detected voltage value defines the electrochemical concentration information. Based on the concentration information, the controller 138 detects the concentration of the aqueous methanol solution supplied to the cell stack 102.

Near the anode inlet I1 of the cell stack 102, a temperature sensor 146 is provided in order to detect the temperature of aqueous methanol solution supplied to the cell stack 102 as the temperature of the cell stack 102.

The cell stack 102 and the aqueous solution radiator 108a are connected with each other by a pipe P5, and the radiator 108a and the aqueous solution tank 116 are connected with each other by a pipe P6. The pipe P5 is connected with an anode outlet I2 of the cell stack 102.

The pipes P1 through P6 serve primarily as a flow path for fuel.

A pipe P7 is connected with the air chamber 136. The air chamber 136 and the air pump 134 are connected with each other by a pipe P8 whereas the air pump 134 and the fuel cell stack 102 are connected with each other by a pipe P9. The pipe P9 is connected with a cathode inlet I3 of the cell stack 102. By driving the air pump 134, air containing oxygen (oxidizer) from the outside is supplied to the cell stack 102. An outside air temperature sensor 148 is provided near an inlet of the pipe p7 to detect an outside air temperature (ambient temperature).

The cell stack 102 and the gas-liquid separation radiator 108b are connected with each other by a pipe P10. The radiator 108b and the water tank 118 are connected with each other by a pipe P11. The water tank 118 is provided with a pipe (an exhaust pipe) P12. The pipe P10 is connected with a cathode outlet I4 of the cell stack 102. The pipe P12 is provided at an exhaust discharge outlet of the water tank 118, and discharges exhaust gas from the cell stack 102 to the outside.

The pipes P7 through P12 serve primarily as a flow path for oxidizer.

The water tank 118 and the water pump 140 are connected with each other by a pipe P13 whereas the water pump 140 and the aqueous solution tank 116 are connected with each other by a pipe P14.

The pipes P13, P14 serve as a flow path for water.

Also, a pipe P15 is connected with a branching section A of the pipe P4 so that a portion of the aqueous methanol solution which flows through the pipe P4 will flow into an ultrasonic sensor 150 attached to the pipe P15. The ultrasonic sensor 150 is arranged to detect the methanol concentration of the aqueous methanol solution, based on the principle that a travel time (propagation speed) of ultrasonic waves in the aqueous methanol solution changes depending on the concentration. The ultrasonic sensor 150 includes a transmitter unit 150a and a receiver unit 150b. An ultrasonic wave transmitted from the transmitter unit 150a is received by the receiver unit 150b to detect an ultrasonic wave travel time in the pipe P15, and a voltage value which corresponds to the travel time is taken as physical concentration information. The controller 138 detects the concentration of the aqueous methanol solution in the pipe P15 based on the concentration information.

A detection valve 152 is connected with the pipe P15. The detection valve 152 and the aqueous solution tank 116 are connected with each other by a pipe P16. When detecting the concentration, the detection valve 152 is closed to stop the flow of aqueous methanol solution in the pipe P15. After the detection of the concentration, the detection valve 152 is opened to release the aqueous methanol solution, whose concentration has been detected, back to the aqueous solution tank 116.

The pipes P15, P16 serve as a flow path for concentration detection.

The aqueous solution tank 116 and the catch tank 130 are connected with each other by pipes P17, P18. The catch tank 130 and the air chamber 136 are connected with each other by a pipe P19.

The pipes P17 through P19 define a flow path for fuel processing.

Next, reference will be made to FIG. 3, to cover an electrical configuration of the fuel cell system 100.

The controller 138 of the fuel cell system 100 preferably includes a CPU 154 for performing necessary calculations and controlling operations of the fuel cell system 100; a clock circuit 156 which supplies the CPU 154 with a clock signal; a memory 158 provided by, e.g., an EEPROM for storing programs and table data for controlling the operations of the fuel cell system 100 as well as calculation data, etc.; a voltage detection circuit 162 for detecting a voltage in an electric circuit 160 to connect the cell stack 102 with the electric motor 38; an electric current detection circuit 164 for detecting an electric current which passes through the cell stack 102; an ON/OFF circuit 166 for opening and closing the electric circuit 160; and a power source circuit 168 for providing the electric circuit 160 with a predetermined voltage.

The CPU 154 of the controller 138 as described above is supplied with input signals from the main switch 142 and the input portion 28c. Also, the CPU 154 is supplied with detection signals from the level sensors 120, 122, and 124, and detection signals from the voltage sensor 144, the temperature sensor 146, the outside air temperature sensor 148 and the ultrasonic sensor 150. Further, the CPU 154 is supplied with voltage values detected by the voltage detection circuit 162 and electric current values detected by the electric current detection circuit 164. The CPU 154 calculates an output from the cell stack 102, based on the voltage values and electric current values supplied.

The CPU 154 controls system components such as the fuel pump 128, the aqueous solution pump 132, the air pump 134, the water pump 140, the fans 110, 112, and the detection valve 152. Also, the CPU 154 controls the display 28b which displays various kinds of information for the driver of the motorbike 10. Further, the CPU 154 controls the ON/OFF circuit 166 by which the cell stack 102 is connected or disconnected with the secondary battery 126 and the drive unit 40.

The secondary battery 126 complements the output from the cell stack 102, by being charged with electric power from the cell stack 102 and discharging the electricity to supply power to the electric motor 38, the system components, etc.

The electric motor 38 is connected with the meter 28a for measuring various data concerning the electric motor 38. The various data obtained by the meter 28a are supplied to the CPU 154 via an interface circuit 170. Also, the CPU 154 is supplied with the charge amount detected by the charge amount detector 44 via the interface circuit 170. The CPU 154 calculates a charge rate of the secondary battery 126 based on the detected charge amount and a capacity of the secondary battery 126.

Figure 4:
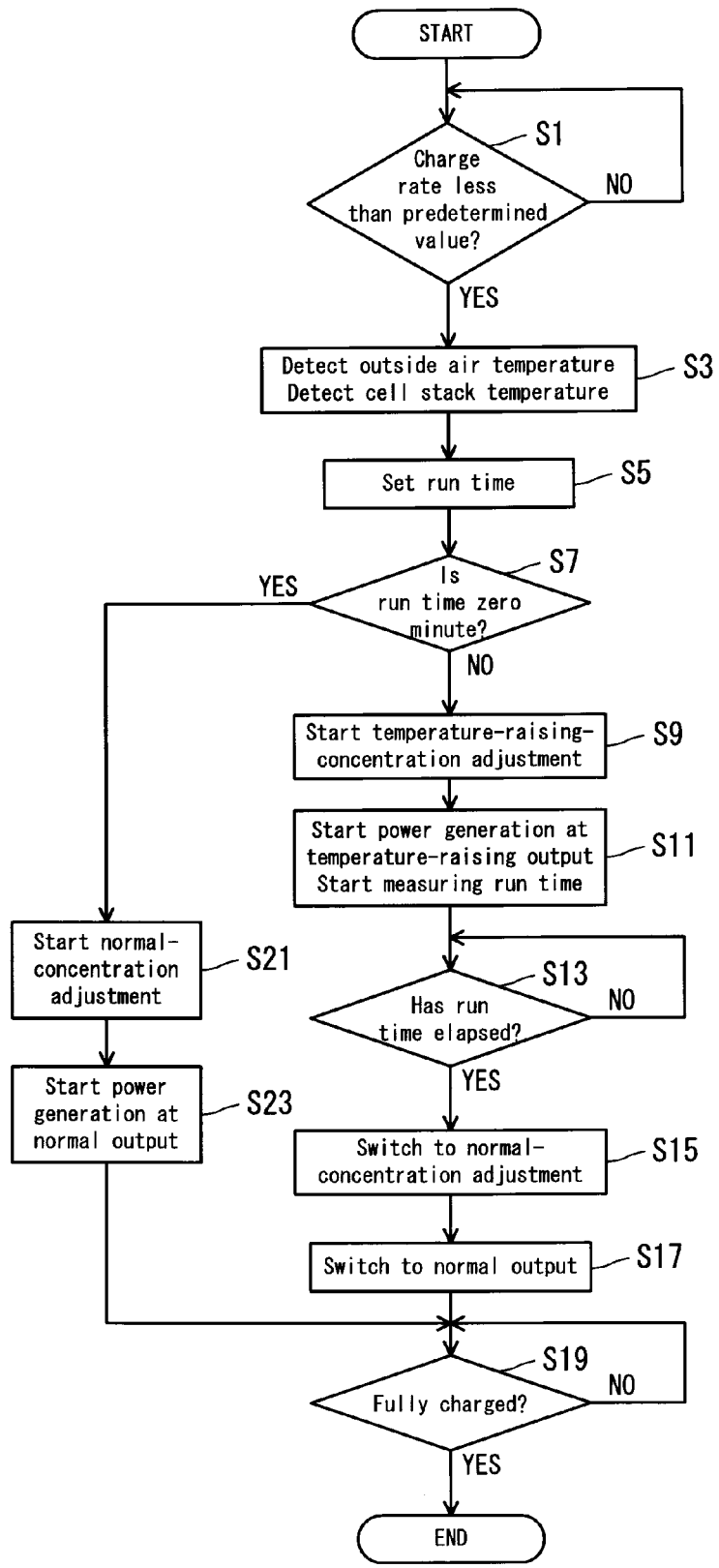
FIG. 4 is a flowchart showing an example of a primary operation of the fuel cell system according to a preferred embodiment of the present invention.
Figure 9:
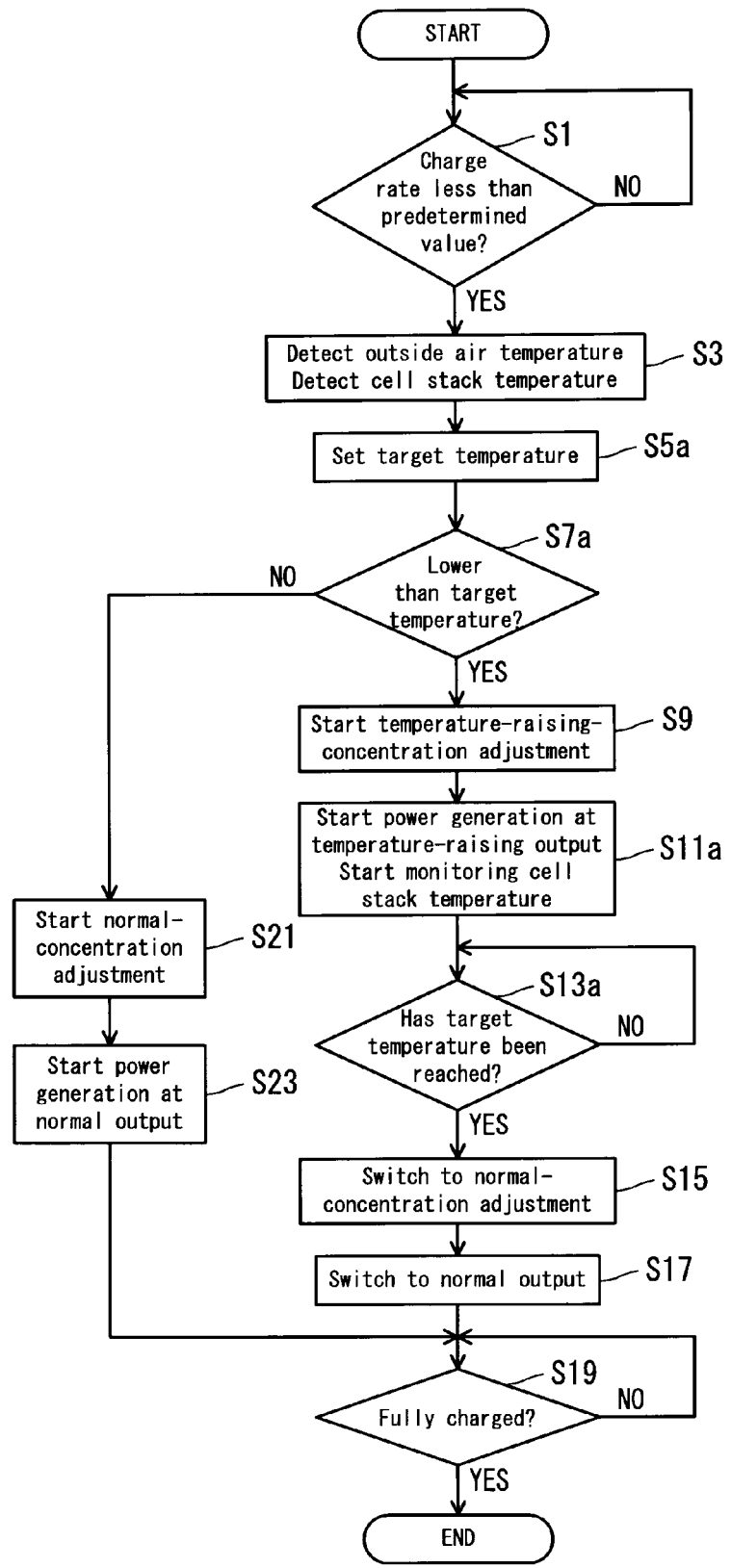
FIG. 9 is a flowchart showing another example of a primary operation of the fuel cell system according to a preferred embodiment of the present invention.

The memory 158 stores programs for executing operations shown in FIG. 4 and FIG. 9, conversion information for converting concentration information provided by the voltage sensor 144 and concentration information provided by the ultrasonic sensor 150 into concentration values respectively, a run time setting table which provides information when setting a run time for the temperature raising operation, a target temperature setting table which provides information for setting the temperature of the cell stack 102 at which the temperature raising operation is stopped, calculation data, etc.

In the present preferred embodiment, the temperature sensor 148 defines the first temperature detection device. The CPU 154 defines the control device. The temperature sensor 146 defines the second temperature detection device. The memory 158 defines the storage device. The adjusting device includes the fuel tank 114 which defines the fuel holding device and the fuel pump 128 which defines the fuel supplying device. The aqueous solution supplying device includes the aqueous solution pump 132.

Next, description will cover a basic operation of the fuel cell system 100.

When the main switch 142 is turned on, the fuel cell system 100 starts the controller 138 and commences its operation. After its operation is commenced, and when the charge rate of the secondary battery 126 becomes smaller than the predetermined value (40%, for example), the ON/OFF circuit 166 is turned on whereby the cell stack 102 is connected with the secondary battery 126. Then, system components such as the aqueous solution pump 132 and the air pump 134 are started using electricity from the secondary battery 126, and thus power generation in the cell stack 102 is started.

Referring to FIG. 2, aqueous methanol solution in the aqueous solution tank 116 is pumped by the aqueous solution pump 132, and is supplied directly to the anode 104b in each of the fuel cells 104 which define the cell stack 102, via the pipes P3, P4 and the anode inlet I1. An output (hereinafter called normal output) of the aqueous solution pump 132 when the cell stack 102 is in normal operation where constant power generation is possible is controlled to 2.0 l/m (liters per minute) by the CPU 154.

Gas (primarily containing carbon dioxide, vaporized methanol, and water vapor) in the aqueous solution tank 116 is supplied via the pipe P17 to the catch tank 130. The methanol vapor and water vapor are cooled in the catch tank 130, and the aqueous methanol solution obtained in the catch tank 130 is returned via the pipe P18 to the aqueous solution tank 116. On the other hand, gas (containing carbon dioxide, non-liquefied methanol, and water vapor) in the catch tank 130 is supplied via the pipe P19 to the air chamber 136.

Meanwhile, air which is introduced by the air pump 134 via the pipes P7 enters the air chamber 136, where it is silenced. The air which was introduced to the air chamber 136 and gas from the catch tank 130 flow via the pipe P8 to the air pump 134, and then through the pipe P9 and the cathode inlet I3, into the cathode 104c in each of the fuel cells 104 which define the cell stack 102.

At the anode 104b in each fuel cell 104, methanol and water in the supplied aqueous methanol solution chemically react with each other to produce carbon dioxide and hydrogen ions. The produced hydrogen ions flow to the cathode 104c via the electrolyte film 104a, and electrochemically react with oxygen in the air supplied to the cathode 104c, to produce water (water vapor) and electric energy. Thus, power generation is performed in the cell stack 102. The electricity from the cell stack 102 is used to charge the secondary battery 126, to drive the motorbike 10 and so on.

The temperature of the cell stack 102 is increased by heat from the various reactions and Joule heat produced by the electric current in the cell stack 102. Carbon dioxide produced at the anode 104b of each fuel cell 104, and aqueous methanol solution including unused methanol are heated by the cell stack 102. The carbon dioxide and the aqueous methanol solution flow from the anode outlet I2 of the cell stack 102, through the pipe P5 into the radiator 108a, where they are cooled. The cooling of the carbon dioxide and the methanol is facilitated by driving the fan 110. The aqueous methanol solution from the radiator 108a flows through the pipe P6, and returns to the aqueous solution tank 116.

By cooling the aqueous methanol solution by the radiator 108a as described above, the temperature of the fuel methanol solution in the aqueous solution tank 116 and thus the temperature of the cell stack 102 are maintained within a predetermined range (about 60° C.~about 70° C.) at a time of normal operation. In the present preferred embodiment, the heat resistant temperature of the electrolyte film 104a of each fuel cell 104 is about 80° C. Therefore, it becomes possible to reduce deterioration of the electrolyte film 104a by maintaining the temperature of the cell stack 102 within the predetermined range.

Meanwhile, most of the water vapor produced on the cathode 104c in each fuel cell 104 is liquefied and discharged in the form of water from the cathode outlet I4 of the cell stack 102, with saturated water vapor being discharged in the form of gas. The water vapor which was discharged from the cathode outlet I4 is supplied via the pipe P10 to the radiator 108b, where it is cooled and its portion is liquefied as its temperature decreases to or below the dew point. The liquefying operation of the water vapor by the radiator 108b is facilitated by operation of the fan 112. Discharge from the cathode outlet I4, which contains water (liquid water and water vapor), carbon dioxide, and unused air, is supplied via the pipe P10, the radiator 108b, and the pipe P11 to the water tank 118 where water is collected, and thereafter, discharged to the outside via the pipe P12.

At the cathode 104c in each fuel cell 104, the vaporized methanol from the catch tank 130 and methanol which has moved to the cathode 104c due to crossover react with oxygen in the platinum catalyst layer thereby being decomposed to harmless substances of water and carbon dioxide. The water and carbon dioxide which are produced from the methanol are discharged from the cathode outlet I4 and supplied to the water tank 118 via the radiator 108b. Further, water which has moved due to water crossover to the cathode 104c in each fuel cell 104 is discharged from the cathode outlet I4, and supplied to the water tank 118 via the radiator 108b.

Water in the water tank 118 which defines the water holding device is pumped by the water pump 140 and supplied appropriately to the aqueous solution tank 116 which defines the aqueous solution holding device via the pipes P13, P14. Based on a detection signal from the level sensor 122, the CPU 154 controls the water pump 140 so that aqueous methanol solution in the aqueous solution tank 116 will be maintained at a predetermined liquid level (a predetermined liquid amount).

Methanol fuel in the fuel tank 114 is pumped by the fuel pump 128 and supplied appropriately to the aqueous solution tank 116 via the pipes P1, P2. The CPU 154 controls the fuel pump 128 so that the aqueous methanol solution in the aqueous solution tank 116 will be maintained at a predetermined concentration, based on a concentration detected by using the voltage sensor 144 or the ultrasonic sensor 150. Electrochemical reactions in the fuel cell 104 become more active when the temperature of the aqueous methanol solution is higher. This means that the higher the aqueous methanol solution temperature, the larger the open-circuit voltage difference between two different concentrations in the aqueous methanol solution. Therefore, when the temperature of the cell stack 102 is relatively high, concentration of the aqueous methanol solution can be detected accurately by using the voltage sensor 144. On the other hand, the ultrasonic propagation speed difference in methanol and in water becomes greater when the temperature of the aqueous methanol solution is lower. This means that when the temperature of the cell stack 102 is relatively low, concentration of the aqueous methanol solution can be detected accurately by using the ultrasonic sensor 150. When the temperature of the cell stack 102 is not lower than about 45° C., the CPU 154 detects the concentration of the aqueous methanol solution by using the voltage sensor 144, whereas it detects the concentration of aqueous methanol solution by using the ultrasonic sensor 150 when the temperature of the cell stack 102 is lower than about 45° C. For example, at a time of normal operation, the CPU 154 drives the fuel pump 128 based on the concentration detected by using the voltage sensor 144, whereby the concentration of aqueous methanol solution in the aqueous solution tank 116 is maintained at 3 wt %.

According to the fuel cell system 100 as described above, the output from the cell stack 102 increases as the cell stack temperature increases, and the system shifts to normal operation where constant power generation is possible, when the cell stack 102 attains a predetermined temperature (for example, about 60° C. in the present preferred embodiment). In the normal operation, the cell stack 102 has a sufficient output to charge the secondary battery 126 and to cover the amount of power consumed by the system components as well as by the electric motor 38, etc. This is why it is desirable to shift to the normal operation quickly. In the fuel cell system 100, a temperature raising operation for quickly increasing the temperature of the cell stack 102 is performed as necessary.

In the fuel cell system 100, the temperature raising operation is performed by driving the aqueous solution pump 132 at a greater output (for example, about 3.0 l/m: hereinafter called temperature raising output) than a normal output (for example, about 2.0 l/m) while maintaining aqueous methanol solution in the aqueous solution tank 116 at a higher concentration (for example, about 5 wt %: hereinafter called temperature raising concentration) than a concentration (for example, about 3 wt %: hereinafter called normal concentration) for normal operation.

When the concentration of aqueous methanol solution which is supplied to the cell stack 102 is maintained at the temperature raising concentration (for example, about 5 wt %), the amount of methanol crossover to the cathode 104c becomes greater than in normal operation. Likewise, when the aqueous solution pump 132 is driven at the temperature raising output (for example, about 3.0 l/m), the pressure inside the anode 104b becomes greater than in normal operation, and the amount of methanol crossover to the cathode 104c becomes greater. By increasing the amount of methanol which makes a crossover to the cathode 104c as described, it becomes possible to increase chemical reactions between methanol and oxygen at the cathode 104c, and to increase the temperature of the cell stack 102 quickly.

In order to set an ending time (stop timing) of the above-described temperature raising operation, a run time setting table is stored in advance in the memory 158, as information which indicates a corresponding relationship between the outside air temperature, the temperature of the cell stack 102, and the run time for which the temperature raising operation is performed. Table 1 shows an example of the run time setting table.

TABLE 1

| | Outside Air Temp | | | | |
|---|---|---|---|---|---|
| Cell Stack Temp | Not lower than 0° C. and lower than 10° C. | Not lower than 10° C. and lower than 20° C. | Not lower than 20° C. and lower than 30° C. | Not lower than 30° C. and lower than 40° C. | Not lower than 40° C. and lower than 50° C. |
| Not lower than 0° C. and lower than 10° C. | 11 minutes | 10.5 minutes | 10 minutes | 9.5 minutes | 9 minutes |
| Not lower than 10° C. and lower than 20° C. | 9 minutes | 8.5 minutes | 8 minutes | 7.5 minutes | 7 minutes |
| Not lower than 20° C. and lower than 30° C. | 7 minutes | 6.5 minutes | 6 minutes | 5.5 minutes | 5 minutes |
| Not lower than 30° C. and lower than 40° C. | 5 minutes | 4.5 minutes | 4 minutes | 3.5 minutes | 3 minutes |
| Not lower than 40° C. and lower than 50° C. | 3 minutes | 2.5 minutes | 2 minutes | 1.5 minutes | 1 minute |
| Not lower than 50° C. and lower than 55° C. | 1 minute | 0.5 minutes | 0 minutes | 0 minutes | 0 minutes |
| Not lower than 55° C. | 0 minutes | 0 minutes | 0 minutes | 0 minutes | 0 minutes |

The CPU 154 obtains a run time which corresponds to an outside air temperature which is detected by the outside air temperature sensor 148 and a temperature of the cell stack 102 which is detected by the temperature sensor 146, from the run time setting table, and sets this time value as the run time for the current temperature raising operation. For example, if the outside air temperature is not lower than about 20° C. and lower than about 30° C., and the temperature of the cell stack 102 is not lower than about 20° C. and lower than about 30° C., the run time for the temperature raising operation is set to six minutes.

Attention should be paid in the run time setting table in Table 1 to a fact that the run time becomes shorter as the outside air temperature becomes higher. Cooling capability of the radiator 108*a* is influenced by the outside air temperature and therefore, if the temperature raising operation is performed for a long time when the outside air temperature is high, there is a risk that the temperature of the cell stack 102 will exceed the heat resistant temperature (about 80° C.) of the electrolyte film 104*a* after the temperature raising operation. By setting a run time based on a run time setting table which takes the outside air temperature also into account, it becomes possible to bring the cell stack 102 quickly to a predetermined temperature (about 60° C.) through the temperature raising operation, and to avoid the unwanted consequence that the temperature of the cell stack 102 will exceed (overshoot) the heat resistant temperature (about 80° C.) of the electrolyte film 104*a* after the temperature raising operation.

It should be noted here that when the run time is zero minutes, it means that the temperature of the cell stack 102 is at the preferred temperature and there is no need to perform the temperature raising operation.

Next, description will cover a process in the fuel cell system 100 when a run time is set for the temperature raising operation by using the run time setting table, with reference to FIG. 4.

First, when Step S1 determines that the secondary battery 126 has a charge rate which is lower than a predetermined value (40%), an outside air temperature is detected by using the outside air temperature sensor 148, and a temperature of the cell stack 102 is detected by using the temperature sensor 146 (Step S3). The CPU 154 obtains a run time which corresponds to the outside air temperature and the temperature of the cell stack 102 that are detected, from a run time setting table (see Table 1) which is stored in advance in the memory 158, and sets this value as the run time for the current temperature raising operation (Step S5).

Subsequently, the CPU 154 determines whether or not the run time is zero minutes (Step S7). In other words, the CPU 154 determines whether or not the temperature raising operation is necessary. If the run time is not zero minutes, the CPU 154 starts controlling the fuel pump 128 so that aqueous methanol solution which is to be supplied to the cell stack 102 will be maintained at a temperature raising concentration (5 wt %). In other words, the CPU 154 starts a temperature raising concentration adjustment (Step S9).

In Step S9, the CPU 154 drives the fuel pump 128 based on a concentration detected by using the voltage sensor 144 or the ultrasonic sensor 150, and thereby adjusts the concentration of aqueous methanol solution in the aqueous solution tank 116 to the temperature raising concentration (5 wt %). Thereafter, the CPU 154 drives the fuel pump 128 based on a concentration detection result at a predetermined time interval, whereby the aqueous methanol solution in the aqueous solution tank 116 is maintained at the temperature raising concentration.

Subsequently, the CPU 154 starts driving the aqueous solution pump 132 at a temperature raising output (for example, about 3.0 l/m), and starts driving the air pump 134, thereby starting power generation in the cell stack 102. By conducting power generation at the temperature raising concentration (for example, about 5 wt %) and the temperature raising output (for example, about 3.0 l/m), it is possible to raise the temperature of the cell stack 102 more quickly than by conducting power generation at the normal concentration (for example, about 3 wt %) and the normal output (for example, about 2.0 l/m). Simultaneously with this, the CPU 154 starts measuring the run time based on a clock signal from the clock circuit 156. In other words, while causing the cell stack 102 to start power generation at the temperature raising output, the CPU 154 starts a measurement of the run time (Step S11).

Then, the system waits until the run time which is set in Step S5 has elapsed (Step S13). When the run time has elapsed, the CPU 154 starts controlling the fuel pump 128 so that aqueous methanol solution in the aqueous solution tank 116 will be maintained at the normal concentration (for example, about 3 wt %). In other words, a shift is made from the temperature raising concentration adjustment to normal concentration adjustment (Step S15). Subsequently, the CPU 154 switches the output of the aqueous solution pump 132 from the temperature raising output (for example, about 3.0 l/m) to the normal output (for example, about 2.0 l/m) (Step S17). In other words, the CPU 154 stops the temperature raising operation and causes the cell stack 102 to generate power at the normal concentration and the normal output, if there is a lapse of the run time which was set in Step S5.

Thereafter, a shift is made to normal operation, and when Step S19 determines that the secondary battery 126 has been fully charged (e.g., charge rate of about 98%), power generation in the cell stack 102 is stopped and the process is brought to an end.

On the other hand, if Step S7 determines that the run time is zero minutes, the CPU 154 starts the normal concentration adjustment (Step S21), starts driving the aqueous solution pump 132 at the normal output (for example, about 2.0 l/m), and starts driving the air pump 134 (Step S23). In other words, the CPU 154 causes the cell stack 102 to start power generation at the normal concentration and the normal output if there is no need to perform the temperature raising operation. Thereafter, when Step S19 determines that the secondary battery 126 has been fully charged, power generation is stopped and the process is brought to an end.

It should be noted here that the Steps S9 and S11 may be performed in the reverse order, or they may be performed simultaneously with each other. The same applies to Steps S15 and S17.

Also, in the process shown in FIG. 4, description was made for a case where concentration adjustment is made based on a detected concentration of aqueous methanol solution. However, detection of the concentration of aqueous methanol solution is not necessarily required. For example, if only a short time has elapsed since the previous normal operation, it is reasonable to assume that the concentration of aqueous methanol solution in the aqueous solution tank 116 is for example, about 3 wt %. In such a case, the temperature raising concentration adjustment or the normal concentration adjustment may be performed by supplying a predetermined amount of methanol fuel to the aqueous solution tank 116 at a predetermined time interval without detecting the concentration.

Further, in the process shown in FIG. 4, description was made for a case where measuring of the run time is started when power generation is started. However, the start timing for the run time measurement is not limited to this. For example, the run time measurement may be started simultaneously as the temperature raising concentration adjustment is started. In this case, the amount of time from the start of the temperature raising concentration adjustment to the start of power generation should be added to each run time value in the run time setting table in Table 1.

It should be noted here that in the process shown in FIG. 4, description was made for a case where the process checks if the run time is zero minutes or not, to determine whether or not it is necessary to perform the temperature raising operation. However, determination on the necessity of the temperature raising operation may be made based on the temperature of the cell stack 102.

Also, in the process shown in FIG. 4, description was made for a case where the run time for the temperature raising operation is set before starting power generation. However, the timing for setting the run time and the timing for starting the temperature raising operation are discretionary. For example, the process may first start power generation at the normal concentration and the normal output, then detect an outside air temperature and a temperature of the cell stack 102 to set the run time for the temperature raising operation, and then start the temperature raising operation. Also, the run time for the temperature raising operation may be set after the temperature raising operation has been started.

According to the fuel cell system 100 as described, it is possible to set the run time for the temperature raising operation to a short time when the outside air temperature is high, and therefore it is possible to prevent the temperature of the cell stack 102 from exceeding the heat resistant temperature (about 80° C.) of the electrolyte film 104a. In other words, it is possible to bring the temperature of the cell stack 102 to a predetermined temperature (about 60° C.) quickly and stably even if the outside air temperature is high, and to reduce deterioration of the cell stack 102. In addition, it is possible to set the run time for the temperature raising operation to a longer time value when the outside air temperature is low, which means that it is possible, by using the temperature raising operation, to bring the temperature of the cell stack 102 to a predetermined temperature quickly and reliably. As described, it is possible to increase the temperature of the cell stack 102 to a predetermined temperature quickly and stably regardless of the outside air temperature.

When the temperature of the cell stack 102 is close to the predetermined temperature (about 60° C.), and the run time for the temperature raising operation is zero minutes, the temperature raising operation is not performed, whereby it becomes possible to reduce deterioration of the cell stack 102 more reliably.

The temperature raising operation is implemented by causing the cell stack 102 to generate power at a temperature raising concentration (for example, about 5 wt %) and a temperature raising output (for example, about 3.0 l/m). This makes it possible to increase the temperature of the cell stack 102 easily and quickly without relying upon extra components such as a heater.

It is possible to set an appropriate timing to stop the temperature raising operation easily, by obtaining a run time value which corresponds to a detected outside air temperature and a detected temperature of the cell stack 102 from a run time setting table which is stored in the memory 158 in advance.

Since it is possible to raise the temperature of the cell stack 102 to a predetermined temperature quickly and stably according to the fuel cell system 100, the fuel cell system 100 is suitable for the motorbike 10 in which it is especially desirable to shift to normal operation quickly.

Next, description will be made for temperature changes in the cell stack, taking a case of the fuel cell system 100 and a case of a conventional fuel cell system, with reference to FIG. 5 through FIG. 8.

In the fuel cell system 100, a run time for the temperature raising operation was set as described above, whereas in the conventional fuel cell system, the temperature raising operation was stopped when the temperature of the cell stack reached 50° C., regardless of the outside air temperature.

Figure 5:
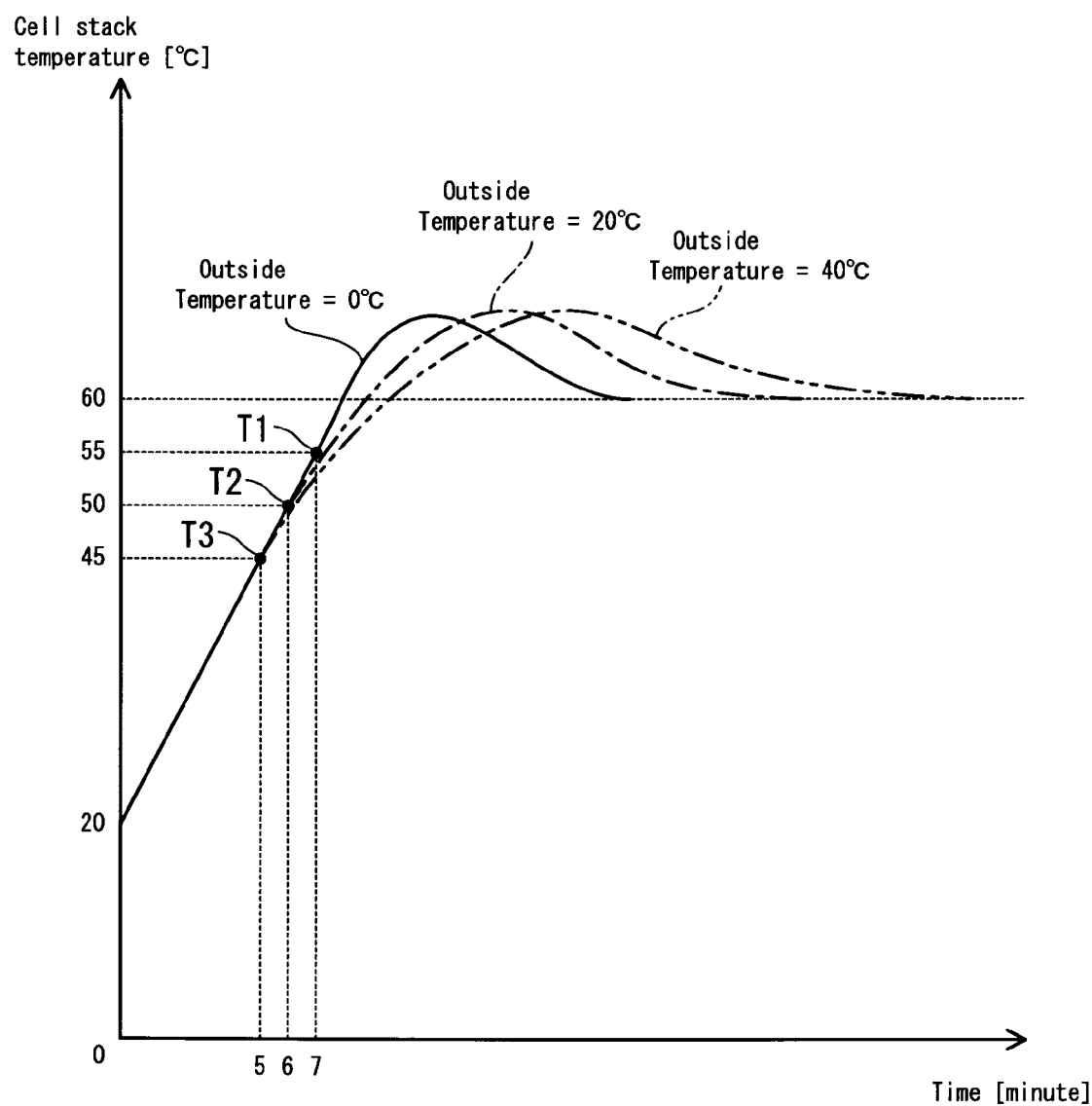
FIG. 5 is a graph showing temperature changes in a cell stack of the fuel cell system according to a preferred embodiment of the present invention.
Figure 6:
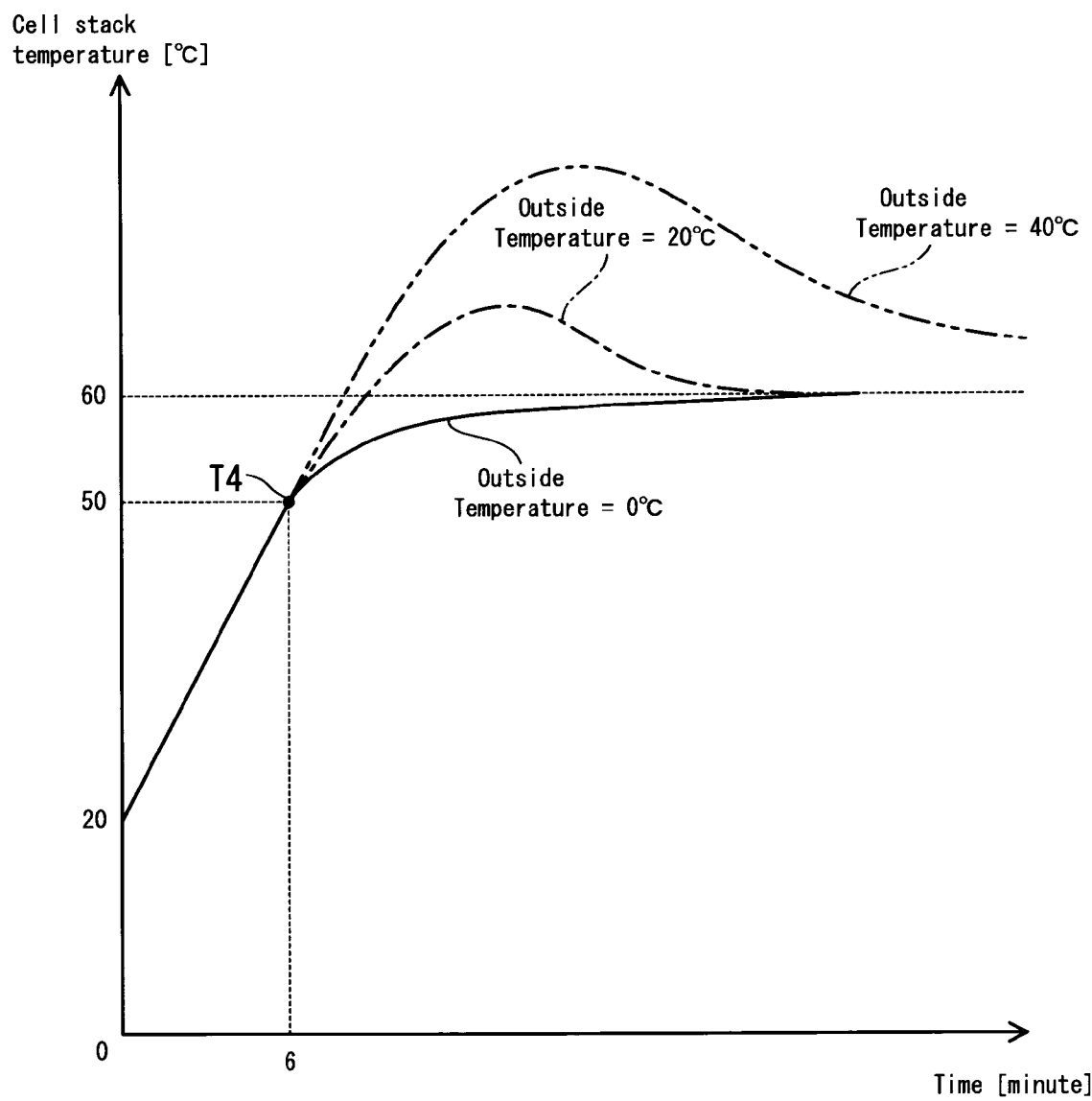
FIG. 6 is a graph showing temperature changes in a cell stack of a conventional fuel cell system.

FIG. 5 shows temperature changes in the cell stack in the fuel cell system 100 whereas FIG. 6 shows temperature changes in the cell stack in the conventional fuel cell system. FIG. 5 and FIG. 6 each show temperature changes in the cell stack in a case where the temperature raising operation was started when the outside air temperature was 0° C. and the cell stack temperature was 20° C., a case where the temperature raising operation was started when the outside air temperature was 20° C. and the cell stack temperature was 20° C., and a case where the temperature raising operation was started when the outside air temperature was 40° C. and the cell stack temperature was 20° C.

As shown in FIG. 5, in the fuel cell system 100, the run time for the temperature raising operation was set to seven minutes when the outside air temperature was 0° C., and the temperature raising operation was stopped when the cell stack temperature was 55° C. (see T1). Also, the run time for the temperature raising operation was set to six minutes when the outside air temperature was 20° C., and the temperature raising operation was stopped when the cell stack temperature was 50° C. (see T2). Further, the run time for the temperature raising operation was set to five minutes when the outside air temperature was 40° C., and the temperature raising operation was stopped when the cell stack temperature was 45° C. (see T3). As described, the fuel cell system 100 was able to vary the cell stack temperature at the completion of the temperature raising operation in accordance with the outside air temperature, making the highest temperature attained by the cell stack after stopping the temperature raising operation (hereinafter called the highest temperature) substantially the same in all the cases.

On the other hand, as shown in FIG. 6, in the conventional fuel cell system, the temperature raising operation was stopped when the cell stack temperature reached 50° C. (see T4) in all of the cases. Since the radiator's capability to cool the cell stack is influenced by the outside air temperature, there was variation in the cell stack's highest temperature after the temperature raising operation.

Figure 7:
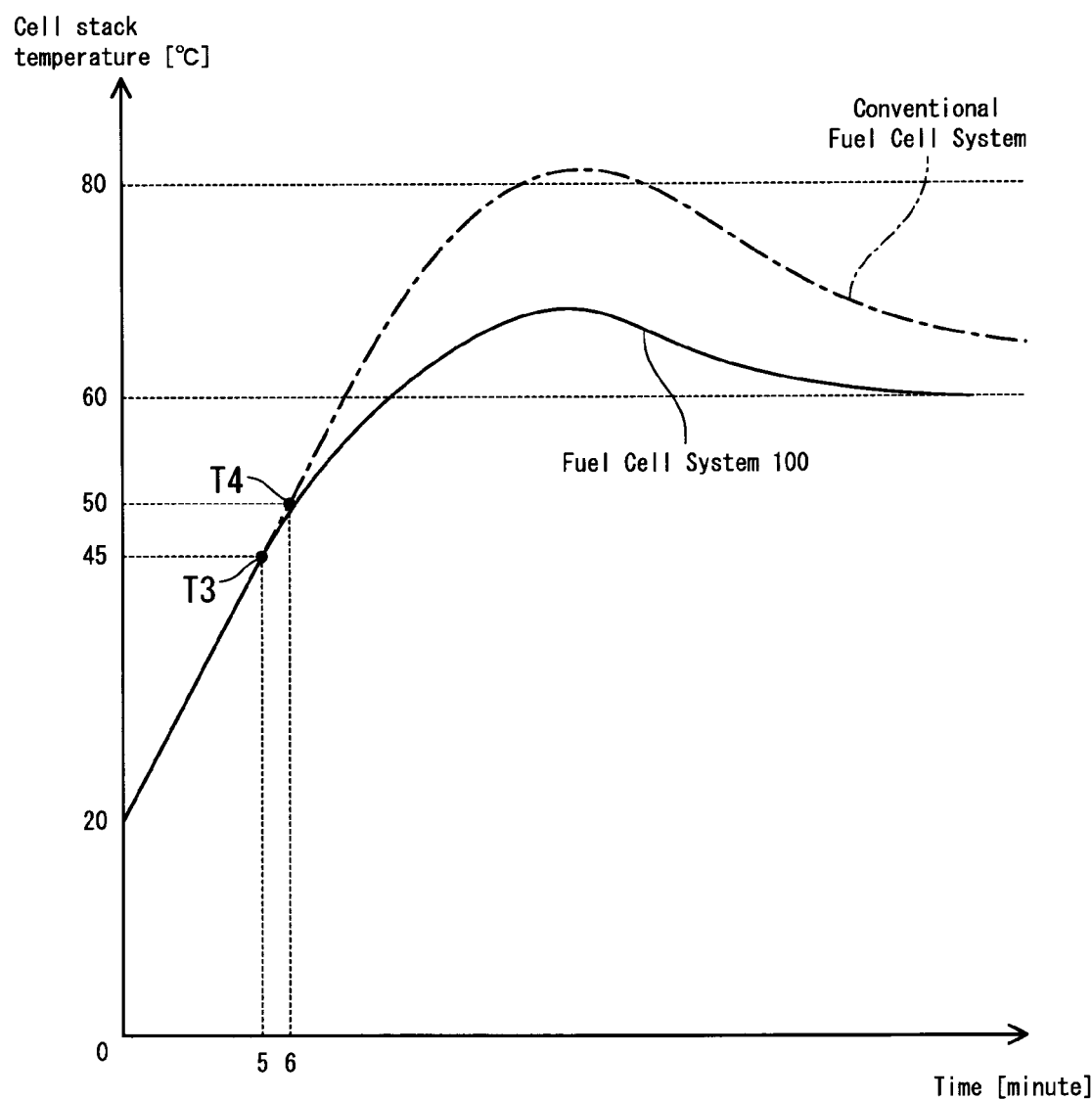
FIG. 7 is a graph showing temperature changes in the cell stack of the fuel cell system according to a preferred embodiment of the present invention and of the conventional fuel cell system, under a high outside air temperature condition.

As shown in FIG. 7, the conventional fuel cell system was not able to stop the cell stack's temperature increase after the temperature raising operation before the temperature hit about 80° C., when the outside air temperature was high (at 40° C. in this case). On the contrary, in the fuel cell system 100, the run time for the temperature raising operation was set to a short period if the outside air temperature was high, the temperature raising operation was stopped when the cell stack temperature was 45° C. (see T3), and therefore the cell stack temperature did not exceed about 80° C.

Figure 8:
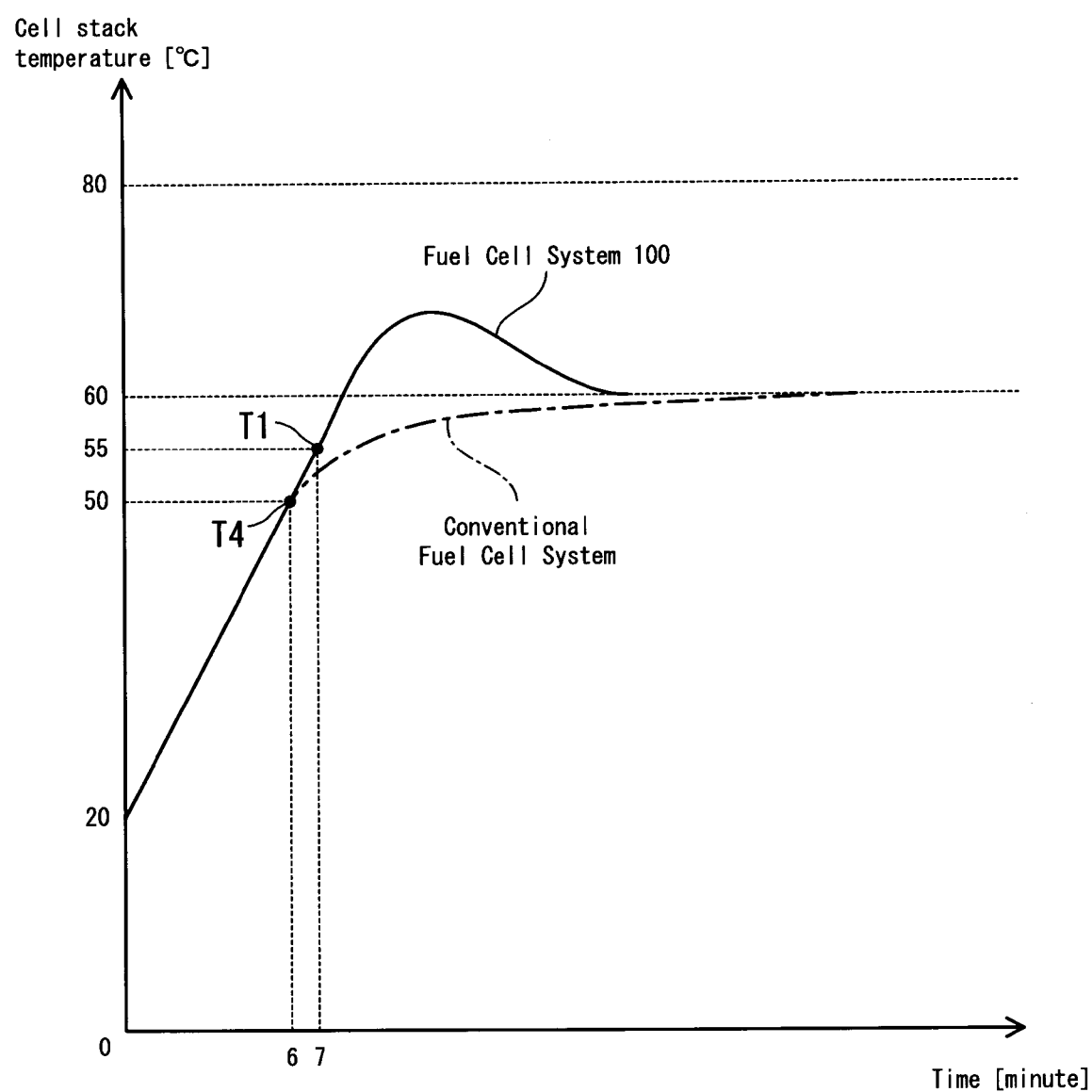
FIG. 8 is a graph showing temperature changes in the cell stack of the fuel cell system according to a preferred embodiment of the present invention and of the conventional fuel cell system, under a low outside air temperature condition.

Also, as shown in FIG. 8, when the outside air temperature was low (at 0° C. in this case), the conventional fuel cell system showed a remarkable slow down in the cell stack's temperature increase after the temperature raising operation, and it took a long time before the cell stack temperature attained about 60° C. On the contrary, in the fuel cell system 100, the run time for the temperature raising operation was set to a long period if the outside air temperature was low, the temperature raising operation was continued until the cell stack temperature attained 55° C. (see T1), and therefore the cell stack temperature was brought to about 60° C. quickly.

As described, the fuel cell system 100 was able to raise the temperature of the cell stack stably to the predetermined temperature even though the outside air temperature was high, and to bring the temperature of the cell stack quickly to the predetermined temperature even if the outside air temperature was low.

It should be noted here that in the above-described preferred embodiments, description was made for a case where a run time setting table preferably is used to set the run time for the temperature raising operation. However, a method of setting the stopping time for the temperature raising operation is not limited to this.

For example, a target temperature setting table may be prepared as information which indicates a corresponding relationship between the outside air temperature and the temperature of the cell stack 102 at which the temperature raising operation should be stopped (hereinafter called target temperature), and this table may be used to set a target temperature which corresponds to a given outside air temperature. Table 2 shows an example of the target temperature setting table which is stored in the memory 158 in advance.

TABLE 2

| Outside Air Temp | Not lower than 0° C. and lower than 10° C. | Not lower than 10° C. and lower than 20° C. | Not lower than 20° C. and lower than 30° C. | Not lower than 30° C. and lower than 40° C. | Not lower than 40° C. and lower than 50° C. | Not lower than 50° C. |
|---|---|---|---|---|---|---|
| Target Temp [° C.] | 50 | 52 | 50 | 47 | 45 | 42 |

Attention should be paid in the target temperature setting table to a fact that the target temperature becomes lower as the outside air temperature becomes higher. If the temperature raising operation is stopped at a specific temperature regardless of the outside air temperature, the cell stack temperature will exceed the heat resistant temperature of the electrolyte film when the outside air temperature is high whereas it will take a long time before a predetermined temperature is achieved when the outside air temperature is low, (see FIG. 6 through FIG. 8). From the target temperature setting table, the CPU 154 obtains a target temperature which corresponds to an outside air temperature that is detected by the outside air temperature sensor 148, and uses this value as the target temperature for the current temperature raising operation. As described, by setting a target temperature, it becomes possible to bring the cell stack 102 to a predetermined temperature (about 60° C.) quickly, and to prevent the cell stack 102 from heating up beyond the heat resistant temperature (about 80° C.) of the electrolyte film 104a after the temperature raising operation, just as in the case of setting the run time by using the run time setting table.

Next, description will cover a process in the fuel cell system 100 in the case when a target temperature is set by using the target temperature setting table, with reference to FIG. 9. It should be noted here that the steps in FIG. 4 and in FIG. 9 which are identical with each other are indicated by the same reference symbols, and description will not be repeated.

First, the CPU 154 obtains a target temperature which corresponds to an outside air temperature detected in Step S3, from the target temperature setting table which is stored in the memory 158 in advance (see Table 2), and sets this value as the target temperature for the current temperature raising operation (Step S5a).

Subsequently, the CPU 154 determines whether or not the temperature of the cell stack 102 which was detected in Step S3 is lower than the target temperature which was set in Step S5a (Step S7a). If the value is lower than the target temperature, the process starts the temperature raising concentration adjustment in Step S9.

Subsequently, the CPU 154 causes the cell stack 102 to start power generation at the temperature raising concentration and the temperature raising output, and starts to watch (monitor) the temperature of the cell stack 102 which is detected by the temperature sensor 146 (Step S11a).

Then, the system waits until the cell stack 102 has achieved the target temperature which was set in Step S5a (Step S13a). When the target temperature has been reached, the system shifts from the temperature raising concentration adjustment to the normal concentration adjustment in Step S15, and switches the output of the aqueous solution pump 132 from the temperature raising output to the normal output in Step S17. Thereafter, the system is shifted to normal operation, and when Step S19 determines that the secondary battery 126 has been fully charged, then power generation in the cell stack 102 is stopped and the process is brought to an end.

On the other hand, if Step S7a determines that the temperature of the cell stack 102 is not lower than the target temperature, Step S21 starts the normal concentration adjustment, and Step S23 causes the cell stack 102 to start power generation at the normal concentration and the normal output.

As described, it is also possible to set an appropriate timing to stop the temperature raising operation easily by obtaining a target temperature which corresponds to a detected outside air temperature from a target temperature setting table which is stored in the memory 158 in advance, and therefore it is possible to change the temperature of the cell stack 102 as shown in FIG. 5.

Figure 10:
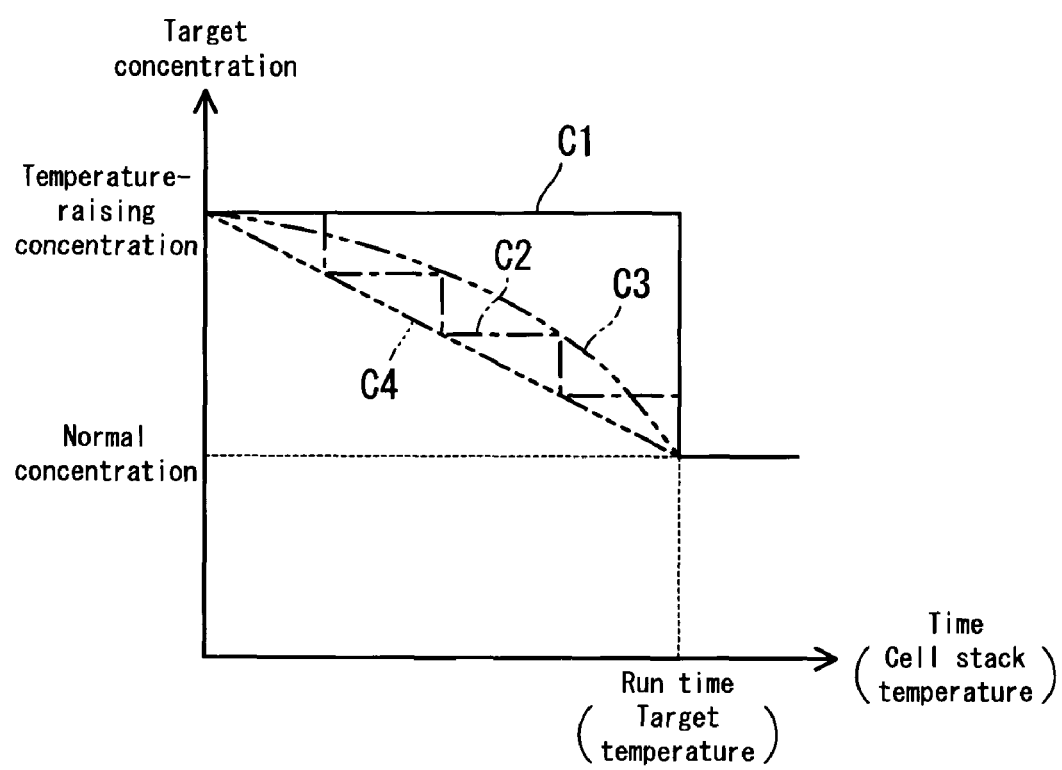
FIG. 10 is a graph showing how a target concentration of aqueous methanol solution is changed in a temperature raising operation.

It should be noted here that in the processes shown in FIG. 4 and FIG. 9, description was made for a case where switching is made preferably from the temperature raising concentration adjustment to the normal concentration adjustment, whereby the target concentration of aqueous methanol solution is switched from the temperature raising concentration to the normal concentration as indicated by C1 in FIG. 10. However, the present invention is not limited to this. The target concentration of aqueous methanol solution for the temperature raising operation may be discretionary and controlled as long as the target concentration of aqueous methanol solution is set to a higher value than for normal operation. For example, the target concentration of the aqueous methanol solution may be stepped down as the run time elapses (as the cell stack's temperature increases) as indicated by C2 in FIG. 10, or it may be decreased continuously along a curve as indicated by C3 in FIG. 10, or it may be decreased continuously and linearly as indicated by C4 in FIG. 10.

In the above-described preferred embodiments, the outside air temperature sensor 148 is disposed near the entrance to the pipe P7. However, the outside air temperature sensor 148 may be disposed at a discretionary location as long as it is possible to detect an outside air temperature. The outside air temperature sensor 148 should preferably be sheltered from rain, as well as from wind when the motorbike runs. Examples of an appropriate location include below the handle 24 and inside the handle support 26 (indicated by a broken line X1 in FIG. 1), as well as underneath the seat rails 20 (indicated by a broken line X2 in FIG. 1).

Also, the temperature of the cell stack or the temperature of the aqueous methanol solution may be used as an outside air temperature if an amount of time has elapsed since power generation was stopped.

In the above-described preferred embodiments, description was made for a case where the second temperature detection device is provided by the temperature sensor 146 which detects the temperature of the aqueous methanol solution supplied to the cell stack 102. However, the second temperature detection device is not limited to this. For example, the second temperature detection device may be a device for detecting the temperature of exhaust from the cell stack 102 as the temperature of the fuel cell, and may be disposed at the cell stack 102. Also, the second temperature detection device may be disposed at a distance from the cell stack 102 as long as it is able to detect the temperature of the fuel cell from the aqueous fuel solution, or from the exhaust.

From the above, it will be understood that the temperature information regarding the outside air temperature may be provided not only by an outside air temperature but by a cell stack temperature or an aqueous methanol solution temperature.

Also, information regarding the temperature of the fuel cell may be provided by the temperature of the aqueous methanol solution supplied to the cell stack 102 or the temperature of the exhaust from the cell stack 102.

It should be noted here that in the above-described preferred embodiments, the run time setting table in Table 1 uses the outside air temperature as the temperature information regarding the outside air temperature, and temperature of the cell stack 102 as the information regarding the temperature of the fuel cell. The target temperature setting table in Table 2 uses the outside air temperature as the information regarding the outside air temperature. In cases where the outside air temperature is provided by a cell stack temperature or by an aqueous methanol solution temperature as mentioned earlier, obtained temperatures may be regarded as the outside air temperature, which means that tables in Table 1 and Table 2 may be used just as they are. Also, in the case where the fuel cell temperature is provided by the temperature of the exhaust from the cell stack 102, obtained exhaust temperatures may be regarded as the fuel cell temperature, which means that the table in Table 1 may be used just as it is. Obviously, however, data in Table 1 and Table 2 may be changed depending on the temperature information regarding the outside air temperature and the information regarding the temperature of the fuel cell.

Further, in the above-described preferred embodiments, description was made for a case where the temperature raising device preferably includes an adjusting device having the fuel tank 114 and the fuel pump 128, and the aqueous solution supplying device having the aqueous solution pump 132. However, the temperature raising device is not limited to this. For example, the temperature raising device may include a heating device such as a heater. Also, a temperature raising operation may be such that aqueous methanol solution which is returned to the aqueous solution tank 116 will bypass the radiator 108a so its temperature will be kept high, and this aqueous methanol solution is supplied to the cell stack 102. In this case, the temperature raising device includes paths (pipes), valves, etc. for returning the aqueous methanol solution directly from the cell stack 102 to the aqueous solution tank 116. Another arrangement to increase the temperature of the cell stack 102 quickly may be to reduce the amount of aqueous methanol solution which circulates in the system. Still another arrangement may be to vary cooling capability by controlling the fan 110 which is used to cool the radiator 108a. Further, combinations of these arrangements may be used.

In the above-described preferred embodiments, description was made for a case where the temperature raising operation is provided by a power generating operation by the cell stack 102 performed at a temperature raising concentration and a temperature raising output. However, the present invention is not limited to this. The temperature raising operation through power generation by the cell stack 102 may use only one condition of the temperature raising concentration and the temperature raising output.

It should be noted here that in the above-described preferred embodiments, description was made for a case where the electrolyte film 104a preferably has a heat resistant temperature of about 80° C. However, the electrolyte film is not limited to this, and the electrolyte film may have any desired heat resistant temperature. Values in the run time setting table and in the target temperature setting table should be changed appropriately, depending on the heat resistant temperature of the electrolyte film to be used.

The preferred embodiments of the present invention include an arrangement where setting of the run time for the temperature raising operation is based on the outside air temperature.

In the above-described preferred embodiments, fuel is provided by methanol, and aqueous fuel solution is provided by aqueous methanol solution. However, the present invention is not limited to this. For example, the fuel may be provided by ethanol or other alcoholic fuel whereas aqueous fuel solution may be provided by an aqueous ethanol solution or other aqueous alcoholic solution.

The preferred embodiments of the present invention are capable of increasing the temperature of the fuel cell 104, i.e., of the cell stack 102, to a predetermined temperature quickly and stably, and therefore the preferred embodiments of the present invention are suitable to fuel cell systems which use liquid fuel.

The preferred embodiments of the present invention are also applicable to hydrogen fuel cell systems which use hydrogen gas as a fuel to be supplied to the fuel cell, as well as to fuel cell systems which use a refiner.

It should be noted here that the fuel cell system according to the preferred embodiments of the present invention can be used suitably not only with motorbikes but also any other transportation equipment such as automobiles, marine vessels, etc.

Also, the preferred embodiments of the present invention are applicable to stationary-type fuel cell systems, and further, to portable-type fuel cell systems which may be incorporated in electronic devices such as personal computers, mobile devices, etc.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A fuel cell system comprising:
   a fuel cell;
   a first temperature detection device arranged to detect temperature information regarding an outside air temperature;
   a temperature raising device arranged to perform a temperature raising operation which increases a temperature of the fuel cell; and
   a control device arranged to set a stopping condition for the temperature raising operation performed by the temperature raising device based on a detection result from the first temperature detection device.

2. The fuel cell system according to claim 1, further comprising a second temperature detection device arranged to detect temperature information regarding a temperature of the fuel cell, wherein the control device determines whether or not the temperature raising operation is necessary based on a detection result from the second temperature detection device.

3. The fuel cell system according to claim 1, wherein the fuel cell includes an aqueous fuel solution for generating power, the temperature raising device includes an adjusting device arranged to adjust a concentration of the aqueous fuel solution, and the control device controls the adjusting device to obtain a higher concentration of the aqueous fuel solution than in normal operation, thereby causing the adjusting device to conduct the temperature raising operation.

4. The fuel cell system according to claim 1, wherein the fuel cell includes an aqueous fuel solution for generating power, the temperature raising device includes an aqueous solution supplying device arranged to supply the aqueous fuel solution to the fuel cell, and the control device controls the aqueous solution supplying device to obtain a higher output of the aqueous solution supplying device than in normal operation, thereby causing the aqueous solution supplying device to conduct the temperature raising operation.

5. The fuel cell system according to claim 1, wherein the control device sets a temperature of the fuel cell for stopping the temperature raising operation based on a detection result from the first temperature detection device.

6. The fuel cell system according to claim 1, wherein the control device sets a run time for the temperature raising operation based on a detection result from the first temperature detection device.

7. The fuel cell system according to claim 6, further comprising:
   a second temperature detection device arranged to detect temperature information regarding a temperature of the fuel cell; and
   a storage device arranged to store information which indicates a correspondence between temperature information regarding the outside air temperature, temperature information regarding the temperature of the fuel cell, and the run time for the temperature raising operation; wherein
   the control device sets a run time for the temperature raising operation based on a detection result from the first temperature detection device, a detection result from the second temperature detection device, and the information stored in the storage device.

8. The fuel cell system according to claim 1, further comprising a liquid fuel.

9. A transportation equipment comprising a fuel cell system to claim 1.

* * * * *